W. B. DUCKWORTH.
Clutches for Machinery.

No. 138,139.    Patented April 22, 1873.

Witnesses.

William B. Duckworth
Inventor
By Atty.

UNITED STATES PATENT OFFICE.

WILLIAM B. DUCKWORTH, OF HAMDEN, ASSIGNOR TO JOHN McLAGON AND HENRY SMITH, OF NEW HAVEN, CONNECTICUT.

IMPROVEMENT IN CLUTCHES FOR MACHINERY.

Specification forming part of Letters Patent No. 138,139, dated April 22, 1873; application filed April 3, 1873.

*To all whom it may concern:*

Be it known that I, WILLIAM B. DUCKWORTH, of Hamden, in the county of New Haven and State of Connecticut, have invented a new Improvement in Machinery-Clutch; and I do hereby declare the following, when taken in connection with the accompanying drawing and the letters of reference marked thereon, to be a full, clear, and exact description of the same, and which said drawing constitutes part of this specification, and represents, in—

Figure 1:
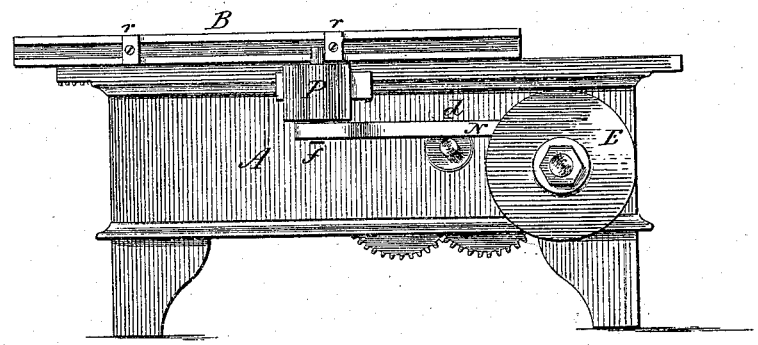
Figure 2:
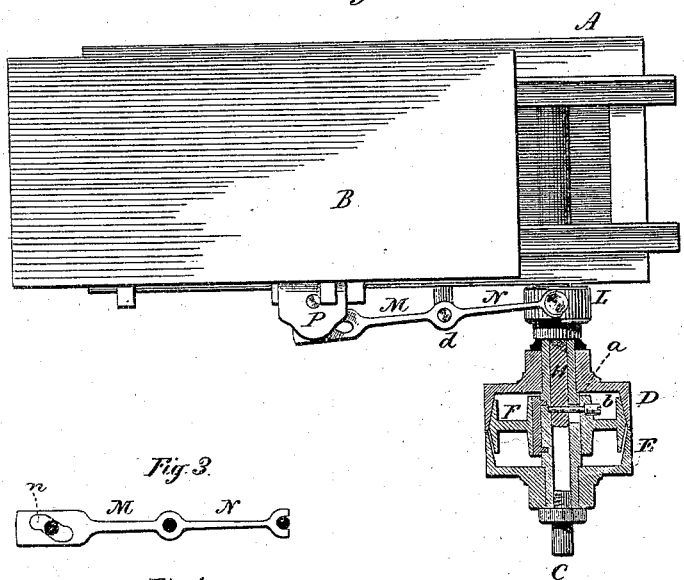

Figure 1, a side view; Fig. 2, a top view; and in Figs. 3, 4, and 5, diagrams illustrating my improvement.

This invention relates to an improvement in the shifting-gear for planing-machines; and it consists in two pulleys, both of which are loose upon the shaft, and with a conical-shaped chamber upon their inside, within which and upon the said shaft is a double conical-faced clutch, combined with a spring-lever through which the clutch is actuated from the platen, so that at the termination of the movement of the platen in one direction the clutch will be thrown into one pulley, and in the opposite direction will be thrown into the other pulley, as more fully hereinafter described.

Figure 3:
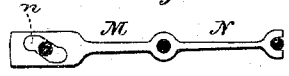
Figure 4:
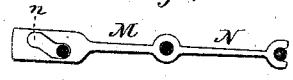
Figure 5:

A is the bed and B the platen of a common iron-planer, the platen driven by any suitable mechanism from a shaft, C, upon which the driving-pulleys D E are arranged to be worked each from its respective belt, one running in one direction and the other in the other direction, both pulleys loose upon the shaft. Both pulleys are chambered out upon their inside and form an inclined or conical surface, as seen in Fig. 2. Within this chamber, and upon the shaft, a double conical-faced clutch is placed, attached to the shaft so as to revolve with it, but yet so as to have a free longitudinal movement—that is, so that it may be drawn into the pulley D, as shown, or thrown out into the other pulley E, the conical surfaces of the clutch corresponding to the internal surface of the respective pulleys, so that a sufficient friction will be created between the pulley and clutch in connection as to cause the clutch and shaft to revolve with that pulley. To actuate this clutch automatically to change from one pulley to the other, I make the shaft C hollow, and within it arrange a slide, H, from which, through a slot, *a*, a bolt or stud, *b*, extends into the clutch F, so as to firmly couple the slide H with the clutch, and over the shaft C a sleeve, L, is arranged, which is also in connection with the slide H through a slot in the shaft, so that by moving the sleeve L out or in the clutch is moved accordingly. From the sleeve a lever extends pivoted to the bed at *d*, one arm, N, of the lever pivoted to the sleeve L, the other arm, M, formed with a slot, *n*, as seen in Figs. 3, 4, and 5, into which slot a stud, *f*, from a slide, P, extends. This slide is arranged upon the side of the bed in substantially the usual manner for the shifting apparatus of iron-planers. The stops *r* on the bed are made adjustable relatively thereto also in the usual manner. The slot *n* is made diagonal, so that as the stud moves from one extreme to the other—as from the position in Fig. 4 to that in Fig. 5—it will impart to the lever a transverse movement to that extent, which movement of the lever also moves the sleeve and clutch, one extreme engaging one pulley, the other extreme the other pulley, an intermediate position, as in Fig. 3, leaving the clutch free, so that the pulleys have no effect thereon.

It will be very difficult, if not impossible, to so adjust the clutch as to make its operation successful if the lever were perfectly rigid. I therefore make the lever of steel and somewhat elastic, so that the clutch will have been brought into close contact with the pulley, to which it is drawn before the full throw of the lever is complete, the lever yielding for the completion of the throw, and thus bringing the reaction or elastic strain of the lever to hold the clutch into the pulley—that is, the clutch is drawn into the pulley by an elastic force.

I claim as my invention—

The combination of the platen B of an iron-planer, the driving-shaft C and loose pulleys D E on the said shaft, the clutch F constructed with a double conical face, and the pulleys constructed with a corresponding internal face, and the lever M N, when the said lever is made elastic and so as to operate substantially as described.

WILLIAM B. DUCKWORTH.

Witnesses:
A. J. TIBBITS,
J. H. SHUMWAY.